United States Patent
Sidiropoulos

(10) Patent No.: US 10,270,324 B2
(45) Date of Patent: Apr. 23, 2019

(54) ELECTRIC MACHINE

(71) Applicant: Volvo Car Corporation, Gothenburg (SE)

(72) Inventor: Nikitas Sidiropoulos, Ojersjo (SE)

(73) Assignee: Volvo Car Corporation, Gothenburg (SE)

( * ) Notice: Subject to any disclaimer, the term of this patent is extended or adjusted under 35 U.S.C. 154(b) by 3 days.

(21) Appl. No.: 15/588,033

(22) Filed: May 5, 2017

(65) Prior Publication Data

US 2017/0373573 A1 Dec. 28, 2017

(30) Foreign Application Priority Data

Jun. 23, 2016 (EP) .................................... 16175979

(51) Int. Cl.
| | |
|---|---|
| *H02K 1/27* | (2006.01) |
| *H02K 21/02* | (2006.01) |
| *B60K 6/26* | (2007.10) |
| *B60L 11/18* | (2006.01) |
| *H02K 11/25* | (2016.01) |
| *H02K 29/03* | (2006.01) |
| *H02K 1/24* | (2006.01) |

(52) U.S. Cl.
CPC .............. *H02K 21/028* (2013.01); *B60K 6/26* (2013.01); *B60L 11/1851* (2013.01); *H02K 1/272* (2013.01); *H02K 1/2766* (2013.01); *H02K 11/25* (2016.01); *H02K 1/246* (2013.01); *H02K 29/03* (2013.01); *H02K 2213/03* (2013.01)

(58) Field of Classification Search
CPC .. H02K 1/02; H02K 1/22; H02K 1/27; H02K 1/272; H02K 1/276; H02K 1/2766; H02K 1/28; H02K 21/02; H02K 21/12; H02K 21/14
See application file for complete search history.

(56) References Cited

U.S. PATENT DOCUMENTS 7,851,958 B2 * 12/2010 Cai ...................... H02K 1/2766
310/156.53
8,760,025 B2 * 6/2014 Rahman ............... H02K 1/2766
310/156.38
(Continued)

FOREIGN PATENT DOCUMENTS

CN 104882981 A 9/2015
EP 0917272 A1 5/1999
(Continued)

*Primary Examiner* — Tran N Nguyen
(74) *Attorney, Agent, or Firm* — Snyder, Clark, Lesch & Chung, LLP

(57) ABSTRACT

An electric machine for a vehicle, comprising a stator, and a rotor comprising a plurality of poles, where each pole comprises a first V-shaped flux barrier and a second V-shaped flux barrier, where the first V-shaped flux barrier comprises two magnets with inner air cavities and outer air cavities, where the second V-shaped flux barrier comprises two magnets with inner air cavities and outer air cavities, and where the first and second V-shaped flux barriers are arranged adjacent each other and symmetrically to a d-axis of the rotor, where each of the poles further comprise a first V-shaped flux redirector arranged symmetrically to the d-axis and between the first V-shaped flux barrier and the second V-shaped flux barrier.

13 Claims, 2 Drawing Sheets

(56) References Cited

U.S. PATENT DOCUMENTS

| | | | |
|---|---|---|---|
| 2005/0140236 A1 | 6/2005 | Jeong et al. | |
| 2007/0063607 A1* | 3/2007 | Hattori | H02K 1/2766 310/156.53 |
| 2008/0231135 A1 | 9/2008 | Suzuki et al. | |
| 2009/0015081 A1* | 1/2009 | Takenaka | H02K 1/2766 310/54 |
| 2009/0045688 A1* | 2/2009 | Liang | H02K 1/2766 310/156.07 |
| 2010/0141076 A1* | 6/2010 | Blissenbach | H02K 1/2766 310/156.53 |
| 2011/0198959 A1* | 8/2011 | Vyas | B60L 11/1803 310/156.21 |
| 2012/0212095 A1* | 8/2012 | Suzuki | H02K 1/2766 310/156.01 |
| 2015/0102695 A1* | 4/2015 | Zhang | H02K 1/2766 310/156.53 |
| 2016/0028279 A1* | 1/2016 | Hao | H02K 1/2766 310/156.43 |

FOREIGN PATENT DOCUMENTS

| | | | |
|---|---|---|---|
| EP | 1914863 A2 | 4/2008 | |
| JP | 2007274798 A | 10/2007 | |
| JP | 2011050216 A | 3/2011 | |
| JP | 2015173545 A | 10/2015 | |

\* cited by examiner

ELECTRIC MACHINE

RELATED APPLICATION

This application claims priority under 35 U.S.C. § 119 based on European Patent Application No. 16175979.0 filed Jun. 23, 2016, the disclosure of which is hereby incorporated by reference herein.

TECHNICAL FIELD

The present invention relates to an electric machine comprising a rotor having a multibarrier design, preferably a permanent magnet assisted reluctance machine, adapted for the use in hybrid, plug-in hybrid and electric vehicles.

BACKGROUND

Some electric motors having a rotor comprising permanent magnets embedded in the rotor will exhibit a strong reluctance variation, depending on the arrangement of the magnets and barriers. Such motors are often used as electric drive motors having a variable speed, e.g. in electric vehicles or hybrid vehicles and comprise a plurality of rotor poles. The difference between the direct inductance Ld in the direction along the d-axis of a pole and the quadrature inductance Lq along the q-axis of the pole is called saliency and produces a so-called reluctance torque when the drive motor is suitably driven by a switching drive circuit. The d-axis is defined to be aligned with the main flux direction of the rotor, i.e. can be seen as the centre axis of the pole, and the q-axis is defined to be aligned with the quadrature of the d-axis in an electrical perspective, i.e. can be seen as the bisector of two adjacent pole centres. This reluctance torque will act in addition to the torque generated by the magnetic flux of the permanent magnets of the rotor.

Rotors having different layouts of the permanent magnets are known. In some rotors, the magnets are arranged substantially in parallel with the outer circumference of the rotor, i.e. perpendicular to the d-axis. In this configuration, the magnets may be arranged with magnetic layers arranged one above the other. Such an arrangement may be referred to as a parallel magnet arrangement, and may comprise two or more magnetic layers arranged symmetrically relative to the d-axis. Preferably, air pockets are arranged on the opposite ends of the magnets, which are intended to obstruct magnetic flux. In other rotors, the magnets are arranged in a V-shape with one or more magnetic layers arranged symmetrically to the d-axis.

The magnetic saliency in the rotor is the result of the arrangement of the permanent magnets. One or more air pockets are used to direct the magnetic flux in a desired manner. The magnetic layers and the air pockets may be arranged to improve the efficiency of the motor, or to obtain an even flux distribution in order to minimize ripple in the motor.

EP 2494678 describes an electric drive motor that is intended for a vehicle, in particular for a motor vehicle, and which includes a stator and a rotor with at least one pole pair, wherein each pole of a respective pole pair has a magnet arrangement having at least one buried magnetic layer. The drive motor is characterized in that each pole has a number of magnetic flux influencing groups, each of which has a number of air-filled recesses, which are not assigned to a magnet of a respective magnetic layer for purposes of flux conductance. In the shown solution, air filled recesses are arranged between the magnet arrangements, at the outer circumference of the rotor. The purpose of the shown solution is to homogenize the magnetic resistance along the air gap in the rotor iron of the motor, in order to minimize the fluctuations of the magnetic flux density in the teeth of a stator.

This and other similar solutions may solve some problems associated with magnetic saliency and saturation of electric motors, but there is still room for an improved electric motor.

SUMMARY OF THE INVENTION

An object of the invention is therefore to provide an improved electric machine having a flux multibarrier design and a flux redirector arranged between the flux barriers. A further object of the invention is to provide a vehicle comprising such an electric machine.

In an electric machine for a vehicle, comprising a stator, and a rotor comprising a plurality of poles, where each pole comprises a first V-shaped flux barrier and a second V-shaped flux barrier, where the first flux barrier comprises two magnets with inner air cavities and outer air cavities, where the second flux barrier comprises two magnets with inner air cavities and outer air cavities, and where the flux barriers are arranged adjacent each other and symmetrically to the d-axis, the object of the invention is achieved in that the pole comprises a first V-shaped flux redirector arranged symmetrically to the d-axis and between the first flux barrier and the second flux barrier.

By this first embodiment of an electric machine according to the invention, an electric machine having an improved efficiency is provided. The rotor of the electric machine comprises a plurality of poles, where a pole comprises a first V-shaped flux barrier and a second V-shaped flux barrier, where the first flux barrier comprises two magnets with inner air cavities and outer air cavities, where the second flux barrier comprises two magnets with inner air cavities and outer air cavities, and where the flux barriers are arranged adjacent each other and symmetrically to the d-axis.

The pole further comprises a first V-shaped flux redirector arranged symmetrically to the d-axis and between the first flux barrier and the second flux barrier. One way to obtain higher reluctance torque is to increase the difference between the inductance in the d-direction and the q-direction in the rotor. The purpose is to control the saturation locally in the rotor iron in order to increase the saliency i.e. increase the reluctance torque. The flux redirector is for this purpose V-shaped with a large root height and can be seen as having a wing shape or a boomerang shape. The tips of the flux redirector are as thin as possible in order to minimize the influence of the inductance in the q-direction.

The exact shape of the V-shaped flux redirector may vary some depending on the shape of the flux barriers, but the root height should be larger than the width of the tips. Further, all corners should be provided with a radius that should be in the same order or larger than the width of a tip. The angle between the legs of the V-shaped flux redirector should correspond to the angle between the magnets of a V-shaped flux barrier.

In a development of the rotor, the rotor comprises a third V-shaped flux barrier and a second V-shaped flux redirector, arranged between the second and third flux barriers. The length of a flux barrier is adapted to the properties of the rotor, such that the flux barriers have different lengths. The shape of the flux redirector is however the same. The rotor may also be provided with a third flux redirector, arranged above the first flux barrier and a forth flux redirector, arranged below the third flux barrier.

In a further development of the rotor, the rotor is provided with air voids arranged at the inner part of the rotor and between the poles of the rotor. The additional air voids will decrease the weight of the rotor and thus the moment of inertia of the rotor. This will provide an increased efficiency and a quicker response of the electric machine. The flux redirectors will also contribute to lower mass and thus lower moment of inertia of the rotor.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims.

Figure 1:
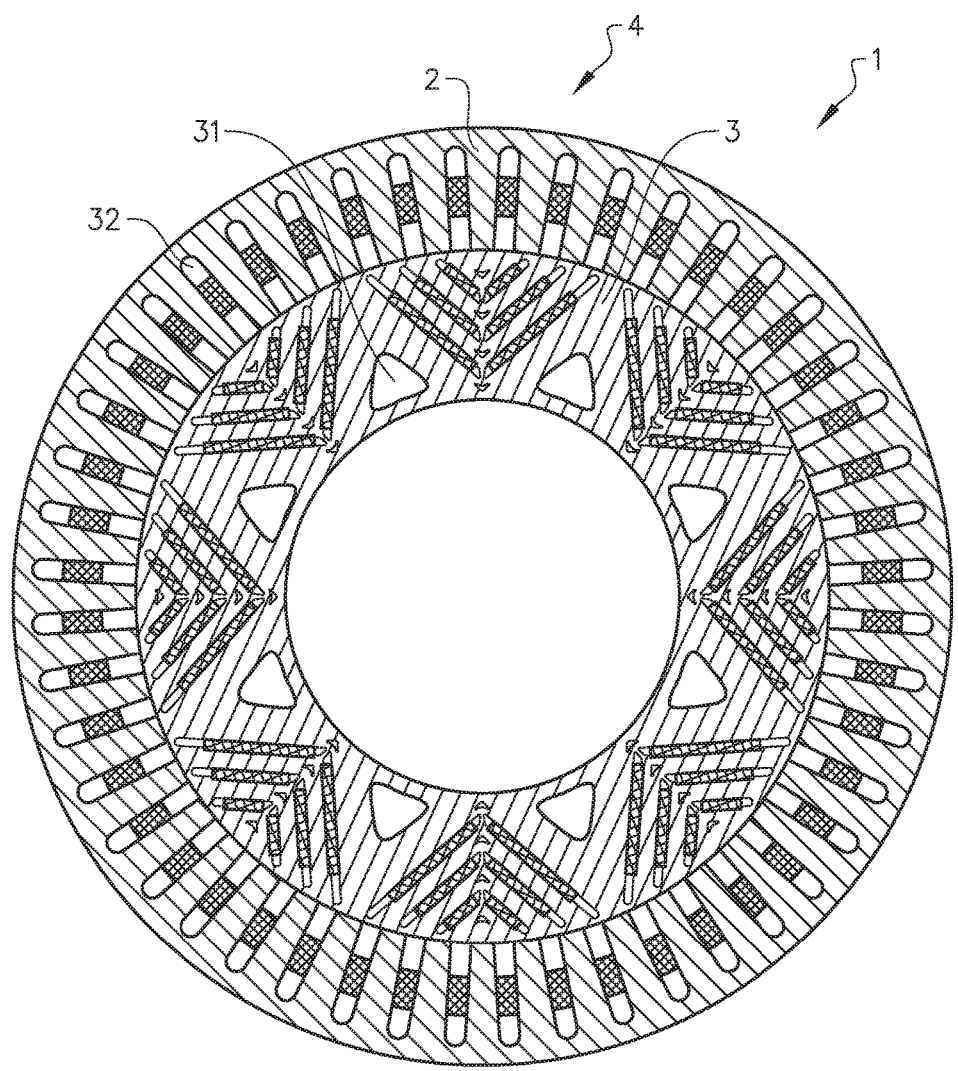
FIG. 1 shows a cut view of a schematic electric machine according to the invention.
Figure 2:
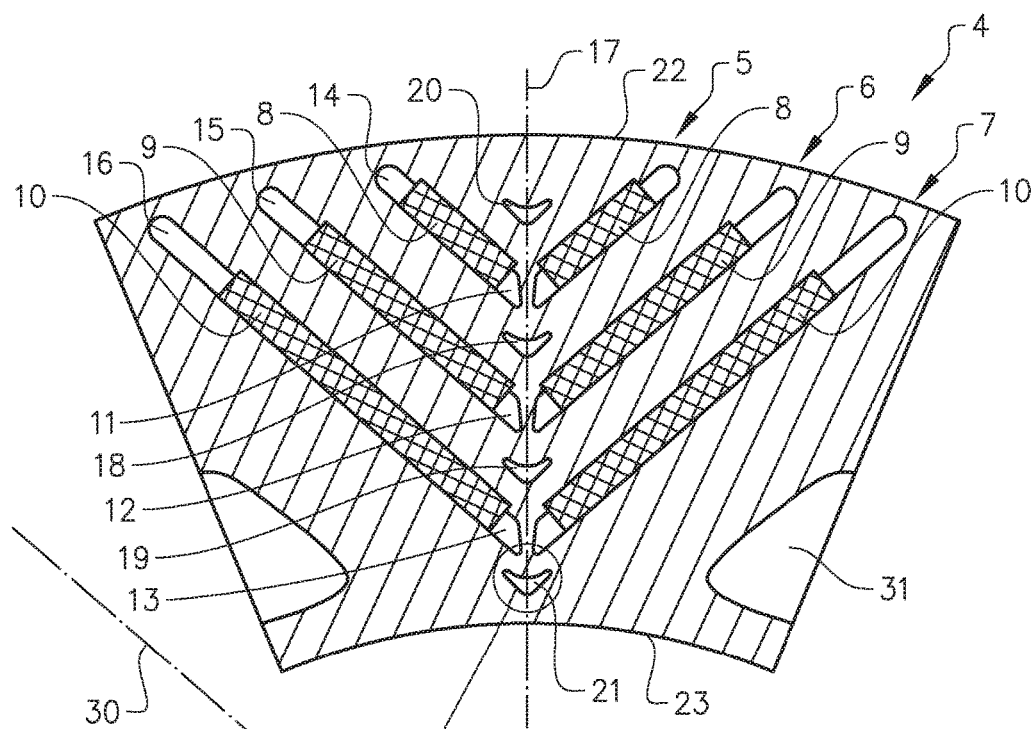
FIG. 2 shows a cut view of a pole from an electric machine according to the invention.
Figure 3:
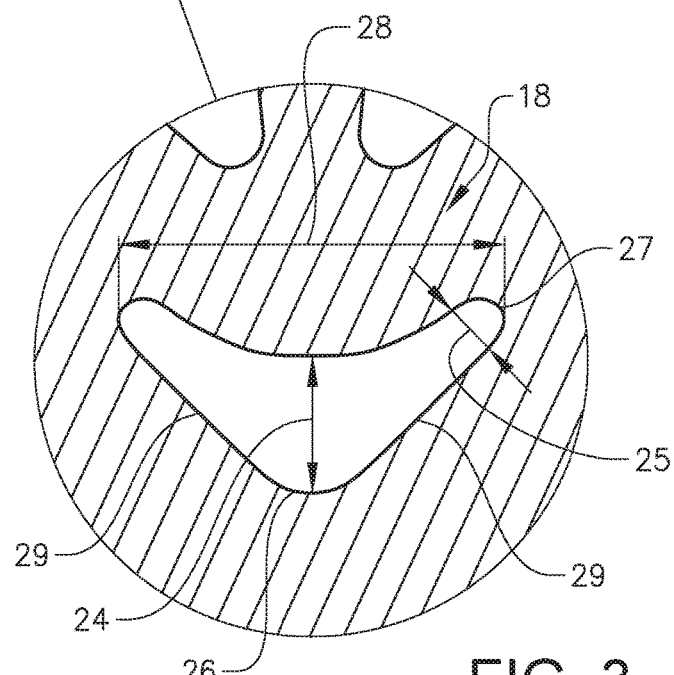
FIG. 3 shows a detail of a flux redirector.

FIG. 1 shows a schematic view of an electric machine according to the invention, FIG. 2 shows a detail of a rotor pole, and FIG. 3 shows a detail of a flux redirector. The electric machine 1 comprises a stator 2 which is arranged in a circular manner around the rotor 3. The stator comprises a plurality of slots or grooves 21 provided with an electric winding adapted to power the electric machine. The windings are preferably arranged in a three phase configuration, even if other phase numbers are possible. The shown stator is provided with 48 slots. The stator is adapted to be powered from a switched electric control unit. The outer diameter of the stator may be e.g. 200-250 mm. The outer diameter of the rotor may be e.g. 150 mm. The peak power of an electric machine may be up to 150 kW or more, with a peak torque of 300 Nm.

The rotor 3 is provided with a plurality of poles 4, in the shown example eight poles. Each pole comprises a plurality of flux barriers, in the shown example a first flux barrier 5, a second flux barrier 6, and a third flux barrier 7. Each flux barrier comprises two magnets arranged in a V-shape comprising an inner and an outer air pocket. The first flux barrier 5 comprises two magnets 8 arranged in a V-shape, where each magnet comprises an inner air pocket 11 and an outer air pocket 14. The second flux barrier 6 comprises two magnets 9 arranged in a V-shape, where each magnet comprises an inner air pocket 12 and an outer air pocket 15. The third flux barrier 7 comprises two magnets 10 arranged in a V-shape, where each magnet comprises an inner air pocket 13 and an outer air pocket 16.

The flux barriers are arranged with the magnets in parallel. The outer air pockets of a flux barrier are arranged as close as possible to the outer periphery 22 of the rotor, while still maintaining the mechanical properties of the rotor, such that the rigidity of the rotor is preserved. The inner are pockets are arranged close to the central d-axis 17 of the rotor. There is a small gap between the inner air pockets of a flux barrier, which provides the mechanical stability of the rotor, but this gap is as small as possible. Each magnet is positioned in a slot in the rotor. A slot is provided with a position for the magnet and an outer air pocket and an inner air pocket. The slot is provided with a wider section, which provides a secure hold of the magnet in the slot, where the magnet is slightly thicker than the slot. The rotor is made from a plurality of thin metal sheets that are laminated side by side to form the rotor, where a sheet may be e.g. 0.2-0.3 mm thick. The pattern in a sheet is cut or stamped, which allows for a cost-effective rotor and still allows for a complicated pattern in each sheet.

Each flux barrier is arranged symmetrically to the d-axis 17. This means that the flux barriers will have different lengths. The length of an individual flux barrier, and the number of flux barriers, depends on the design of the rotor and on the desired properties of the rotor. In the shown example, the outer air pockets also have different lengths. The distance between two adjacent magnets of two flux barriers also depend on the desired properties of the rotor, and is in this example larger than the height of the magnets.

The rotor is provided with a flux redirector arranged between two flux barriers. A first flux redirector 18 is arranged between the first flux barrier 5 and the second flux barrier 6, and a second flux redirector 19 is arranged between the second flux barrier 6 and the third flux barrier 20. In the shown example, a third flux redirector 20 is arranged outside of the first flux barrier 5, between the first flux barrier 5 and the outer periphery 22 of the rotor. A fourth flux redirector 21 is arranged on the inner side of the third flux barrier 7, between the third flux barrier 7 and the inner periphery 23 of the rotor. The first flux redirectors are arranged symmetrically to the d-axis. A flux redirector is V-shaped and may resemble a wing or a boomerang. The purpose of a flux redirector is to increase the saliency that is the difference in inductance between the d-axis and the q-axis. This can be done e.g. decreasing the inductance of the pole in the d-axis as much as possible, and at the same time affect the inductance of the pole along the q-axis 30 as little as possible. The shape of the flux redirector will thus be a compromise.

FIG. 3 shows a preferred shape of a flux redirector. The flux redirector comprises lower sides 29, which preferably are parallel with a magnet of a flux barrier. The lower sides 29 form the lower part of the V-shaped flux redirector. The bottom 26 of the flux redirector is preferably rounded with a radius. The base chord 24, i.e. the height of the base of the flux redirector, has the largest measure of the flux redirector in a direction parallel to the d-axis. The tip chord 25, i.e. the height of a tip, has the smallest measure of the flux redirector. The length of the base chord is preferably at least twice the length of a tip chord. A tip is rounded with a radius, where the radius may e.g. be equal to half the tip chord measure. The width 28 of the flux redirector depends on the other measures of the flux barriers, e.g. the distance between two flux barriers.

The rotor may also be provided with air voids 31 arranged between each pole of the rotor. The air void does not influence the inductance of a pole, but minimizes the amount of material used in the rotor, which allows for a higher efficiency of the electric machine and a lower moment of inertia of the rotor. The air voids are cut or stamped in the foils of the rotor when the foils are produced. The flux redirectors will also contribute to lower mass and thus lower moment of inertia of the rotor.

By the described electric machine, an electric machine having an improved performance is provided. The described rotor will also minimize induced ripple caused by the electric poles when driving the machine as an electric machine. The proposed solution will also make it possible to provide an electric machine which can be controlled without using a resolver for the rotational position of the rotor. Traditionally, this type of electric machine is equipped with a resolver type rotor position sensor in order to be able to control the motor. Saliency in this type of machine can be utilized for sensor less position determination by means of harmonic injection from the inverter. Increased saliency by means of introducing flux redirectors will increase the range of operation of where the harmonic injection can be used. If the saliency of the electric machine is high enough, the position of the rotor can be determined without the use of a resolver type of position sensor.

The use of additional air voids in the rotor will further reduce the mass of the rotor and thus the moment of inertia. The flux redirectors will also contribute to lower mass and thus lower moment of inertia of the rotor.

The invention is not to be regarded as being limited to the embodiments described above, a number of additional variants and modifications being possible within the scope of the subsequent patent claims.

What is claimed is:

1. An electric machine for a vehicle comprising:
a stator, and
a rotor comprising a plurality of poles,
where each pole comprises a first V-shaped flux barrier and a second V-shaped flux barrier,
where the first V-shaped flux barrier comprises two magnets with inner air cavities and outer air cavities,
where the second V-shaped flux barrier comprises two magnets with inner air cavities and outer air cavities, and
where the first and second V-shaped flux barriers are arranged adjacent each other and symmetrically to a d-axis of the rotor, and
where each pole further comprises a first V-shaped flux redirector arranged symmetrically to the d-axis and between the first V-shaped flux barrier and the second V-shaped flux barrier.

2. The electric machine of claim 1, wherein the first V-shaped flux redirector comprises upper and lower sides, and wherein a length of a base chord measured between the upper and lower sides at the d-axis is longer than a length of each tip chord measured between the upper and lower sides at the tips of the first V-shaped flux redirector.

3. The electric machine of claim 1, wherein sides of the first V-shaped flux redirector are parallel to respective sides of the first and second V-shaped flux barriers.

4. The electric machine of claim 1, wherein each pole further comprises a third V-shaped flux barrier arranged adjacent the second V-shaped flux barrier and symmetrically to the d-axis.

5. The electric machine of claim 4, wherein each pole further comprises a second V-shaped flux redirector arranged symmetrically to the d-axis and between the second V-shaped flux barrier and the third V-shaped flux barrier.

6. The electric machine of claim 1, wherein each pole comprises a further V-shaped flux redirector arranged symmetrically to the d-axis and outside of the first V-shaped flux barrier.

7. The electric machine according of claim 4, wherein each pole comprises a further V-shaped flux redirector arranged symmetrically to the d-axis and at an inner side of the third V-shaped flux barrier.

8. The electric machine of claim 1, wherein the rotor is provided with an air void arranged at an inner part of the rotor and between two adjacent poles.

9. The electric machine of claim 1, wherein distances between outer ends of the first and second V-shaped flux barriers and an outer peripheral surface of the rotor are approximately the same.

10. The electric machine of claim 1, wherein the electric machine comprises a permanent magnet assisted reluctance machine.

11. A vehicle comprising an electric machine according to claim 1.

12. The vehicle of claim 11, wherein the vehicle comprises a battery electric vehicle.

13. The vehicle of claim 11, wherein the vehicle comprises a hybrid vehicle comprising a combustion engine.

* * * * *